(12) United States Patent
Hertlein et al.

(10) Patent No.: US 8,845,943 B2
(45) Date of Patent: Sep. 30, 2014

(54) METHOD OF MAKING A STRUCTURED SURFACE AND ARTICLE THEREFROM

(75) Inventors: Thomas Hertlein, Korschenbroich (DE); Leigh E. Wood, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 669 days.

(21) Appl. No.: 12/974,133

(22) Filed: Dec. 21, 2010

(65) Prior Publication Data
US 2012/0151722 A1 Jun. 21, 2012

(51) Int. Cl.
*B29C 43/26* (2006.01)
*A44B 18/00* (2006.01)
*B29L 31/00* (2006.01)
*B29C 59/02* (2006.01)

(52) U.S. Cl.
CPC ....... *A44B 18/0065* (2013.01); *B29L 2031/729* (2013.01); *B29C 59/025* (2013.01)
USPC .............................. 264/167; 264/280; 24/450

(58) Field of Classification Search
USPC ............ 264/167, 280; 24/446, 447, 448, 449, 24/450, 451, 452
See application file for complete search history.

(56) References Cited

U.S. PATENT DOCUMENTS

| | | |
|---|---|---|
| 3,192,589 A | 7/1965 | Pearson |
| 4,775,310 A | 10/1988 | Fischer |
| 4,839,131 A | 6/1989 | Cloeren |
| 4,894,060 A | 1/1990 | Nestegard |
| 5,077,870 A | 1/1992 | Melbye et al. |
| 5,460,769 A | 10/1995 | Kaneko |
| 5,537,723 A | 7/1996 | Yoshida et al. |
| 5,664,302 A | 9/1997 | Thomas |
| 5,679,302 A | 10/1997 | Miller et al. |
| 5,749,129 A | 5/1998 | Murasaki et al. |
| 5,845,375 A | 12/1998 | Miller et al. |
| 5,868,987 A | 2/1999 | Kampfer et al. |
| 5,913,482 A | 6/1999 | Akeno |
| 5,953,797 A | 9/1999 | Provost et al. |

(Continued)

FOREIGN PATENT DOCUMENTS

| | | |
|---|---|---|
| EP | 0 619 085 | 10/1994 |
| EP | 1 774 866 | 4/2007 |

(Continued)

OTHER PUBLICATIONS

International Seach Report of PCT/US2011/066125, dated Apr. 10, 2012, 4 pages.

*Primary Examiner* — Matthew Daniels

(57) ABSTRACT

A method of making a structured surface and a mechanical fastener precursor are disclosed. The method includes providing a thermoplastic backing with spaced-apart, upstanding posts with base portions attached to the thermoplastic backing and distal tips; deforming the distal tips to form caps on at least some of the spaced-apart, upstanding posts to provide capped posts, wherein at least some caps upon forming touch at least one adjacent cap; and separating the capped posts. Typically, the at least some caps upon forming are shaped at least partially by the at least one adjacent cap. The mechanical fastener precursor includes a thermoplastic backing and upstanding male fastening elements with bases attached to the thermoplastic backing and distal caps larger in area than the cross-sectional area of the bases, wherein the bases of the male fastening elements are spaced apart, wherein at least some of the distal caps touch at least one adjacent distal cap.

20 Claims, 5 Drawing Sheets

(56) References Cited

U.S. PATENT DOCUMENTS

| | | |
|---|---|---|
| 6,000,106 A | 12/1999 | Kampfer et al. |
| 6,039,911 A | 3/2000 | Miller et al. |
| 6,054,091 A | 4/2000 | Miller et al. |
| 6,106,922 A | 8/2000 | Cejka et al. |
| 6,132,660 A | 10/2000 | Kampfer |
| 6,190,594 B1 | 2/2001 | Gorman et al. |
| 6,368,097 B1 | 4/2002 | Miller et al. |
| 6,544,245 B2 | 4/2003 | Neeb et al. |
| 6,558,602 B1 | 5/2003 | Melbye et al. |
| 6,708,378 B2 | 3/2004 | Parellada et al. |
| 6,767,492 B2 | 7/2004 | Norquist et al. |
| 6,814,912 B2 | 11/2004 | Ausen et al. |
| 6,899,841 B2 | 5/2005 | Buzzell et al. |
| 7,052,636 B2 | 5/2006 | Ausen et al. |
| 7,052,638 B2 * | 5/2006 | Clarner et al. ............... 264/167 |
| 7,214,334 B2 | 5/2007 | Jens et al. |
| 7,275,290 B2 | 10/2007 | Clarner et al. |
| 7,897,078 B2 | 3/2011 | Petersen et al. |
| 2003/0145440 A1 | 8/2003 | Ausen et al. |
| 2003/0182776 A1 | 10/2003 | Ausen et al. |
| 2004/0187276 A1 | 9/2004 | Seth et al. |
| 2005/0132544 A1 | 6/2005 | Seth et al. |
| 2011/0147475 A1 | 6/2011 | Biegler et al. |
| 2011/0151171 A1 | 6/2011 | Biegler et al. |
| 2012/0151720 A1 | 6/2012 | Hanschen et al. |

FOREIGN PATENT DOCUMENTS

| | | |
|---|---|---|
| EP | 2179671 | 4/2010 |
| JP | 09-121908 | 5/1997 |
| WO | WO 94/23610 | 10/1994 |
| WO | WO 01/81771 | 11/2001 |
| WO | WO 03/101238 | 12/2003 |
| WO | WO 2010/050831 | 5/2010 |
| WO | WO 2011/163193 | 12/2011 |

* cited by examiner

METHOD OF MAKING A STRUCTURED SURFACE AND ARTICLE THEREFROM

BACKGROUND

Articles with one or more structured surfaces are useful in a variety of applications (e.g., abrasive discs, assembly of automobile parts, and disposable absorbent articles). The articles may be provided as films that exhibit, for example, increased surface area, mechanical fastening structures, or optical properties.

Mechanical fasteners, which are also called hook and loop fasteners, typically include a plurality of closely spaced upstanding projections with loop-engaging heads useful as hook members, and loop members typically include a plurality of woven, nonwoven, or knitted loops. Mechanical fasteners are useful for providing releasable attachment in numerous applications. For example, mechanical fasteners are widely used in wearable disposable absorbent articles to fasten such articles around the body of a person. In typical configurations, a hook strip or patch on a fastening tab attached to the rear waist portion of a diaper or incontinence garment, for example, can fasten to a landing zone of loop material on the front waist region, or the hook strip or patch can fasten to the backsheet (e.g., nonwoven backsheet) of the diaper or incontinence garment in the front waist region. Mechanical fasteners are also useful for disposable articles such as sanitary napkins. A sanitary napkin typically includes a back sheet that is intended to be placed adjacent to the wearer's undergarment. The back sheet may comprise hook fastener elements to securely attach the sanitary napkin to the undergarment, which mechanically engages with the hook fastener elements.

The hooks of hook and loop fastening systems may be formed with a curved shape or they may be substantially upright stems that are deformed to include, for example, a head in the shape of mushroom. Some methods, which have varying degrees of versatility and complexity, are available to control the shape of loop-engaging heads. See, e.g., U.S. Pat. No. 3,192,589 (Pearson); U.S. Pat. No. 5,953,797 (Provost et al.); U.S. Pat. No. 6,132,660 (Kampfer); U.S. Pat. No. 6,558,602 (Melbye et al.) and U.S. Pat. No. 6,708,378 (Parellada et al.).

SUMMARY

The present disclosure provides, in one aspect, a method of making a structured surface with a plurality of upstanding capped posts on a thermoplastic backing. The method, which in some embodiments includes stretching the thermoplastic backing, can typically provide mechanical fasteners, for example, with a low cost due at least in part to higher line capacity and reduced raw material consumption. The method is also useful, for example, for making a variety of cap shapes on the upstanding posts using conventional equipment. Typically, the caps upon forming are shaped at least partially by at least one adjacent cap, and the method disclosed herein advantageously allows separate control over the cap shape on the posts regardless of what the post shape is. The cap shape is typically controlled by the pin spacing (i.e., distance between posts) and arrangement of spaced-apart, upstanding posts and the extent of deformation of those posts to form caps.

In one aspect, the present disclosure provides a method of making a structured surface. The method comprises providing a thermoplastic backing with spaced-apart, upstanding posts comprising base portions attached to the thermoplastic backing and distal tips; deforming the distal tips to form caps on at least some of the spaced-apart, upstanding posts to provide capped posts, wherein at least some caps upon forming touch at least one adjacent cap, and wherein the capped posts retain spaced-apart base portions; and separating the capped posts such that the at least some caps no longer touch the at least one adjacent cap. The structured surface may be a mechanical fastener, for example. In some embodiments, the at least some caps upon forming touch at least two adjacent caps.

In another aspect, the present disclosure provides a mechanical fastener precursor having a length in a first direction. The mechanical fastener precursor comprises a thermoplastic backing and upstanding male fastening elements. The upstanding male fastening elements comprise bases attached to the thermoplastic backing and distal caps larger in area than the cross-sectional area of the bases. The bases of the male fastening elements are spaced apart, at least some of the distal caps touch at least one adjacent distal cap when the thermoplastic backing is in an unbent position, and the distal caps are separable upon stretching or bending the thermoplastic backing. The mechanical fastener precursor may be, for example, an intermediate product of the method disclosed herein. In some embodiments, the at least some distal caps touch at least two adjacent distal caps.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "structured surface" refers to a surface with other than a planar or smooth surface.

The term "upstanding" refers to posts that protrude from the thermoplastic backing and includes posts that stand perpendicular to the backing and posts that are at an angle to the backing other than 90 degrees.

The term "spaced-apart" refers to posts that are formed to have a distance between them. The bases of "spaced-apart" posts do not touch each other before or after stretching the thermoplastic backing when the thermoplastic backing is in an unbent configuration.

Caps upon forming that are said to be "shaped at least partially by at least one adjacent cap" are those that have a shape that is influenced by the at least one adjacent cap as described below.

Distal caps that are "separable" refers to distal caps that are not fused together and are capable of separating when the thermoplastic backing to which the bases are attached is stretched or bent.

The terms "first" and "second" are used in this disclosure in their relative sense only. It will be understood that, unless otherwise noted, those terms are used merely as a matter of convenience in the description of one or more of the embodiments.

The term "row" refers to upstanding posts lined up in a particular direction. The row or line of upstanding posts may be substantially straight although in some embodiments, rows can deviate from linearity. For a mechanical fastener precursor or method according to the present disclosure, a thermoplastic backing having rows (that is, more than one row) of upstanding posts can comprise any number of rows.

The term "loop-engaging" as used herein relates to the ability of a mechanical fastener element (i.e., hook element) to be mechanically attached to a loop material. Generally, hook elements with loop-engaging heads have a cap shape that is different from the shape of the post. The loop-engageability of hook elements may be determined and defined by using standard woven, nonwoven, or knit materials. A region of posts with loop-engaging caps generally will provide, in combination with a loop material, at least one of a higher peel strength, higher dynamic shear strength, or higher dynamic friction than a region of posts without loop-engaging caps.

The term "machine direction" (MD) as used herein denotes the direction of a running, continuous web of the thermoplastic useful for some embodiments of the method of making a structured surface disclosed herein. When a patch of a structured surface is a smaller portion cut from a continuous web, the machine direction generally corresponds to the length "L" of the structured surface. As used herein, the terms machine direction and longitudinal direction are typically used interchangeably. The term "cross-direction" (CD) as used herein denotes the direction which is essentially perpendicular to the machine direction. When a patch of a structured surface is a smaller portion cut from a continuous web, the cross direction corresponds to the width "W" of the structured surface.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1A:
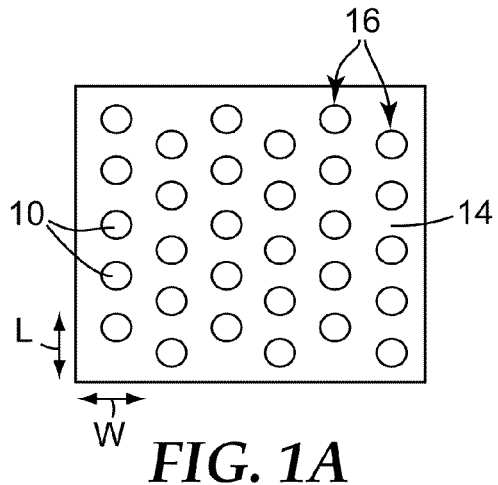
FIGS. 1A through 1D are top views of an embodiment of a structured surface at different stages of the method of making the structured surface according to the present disclosure.

Reference will now be made in detail to embodiments of the disclosure, one or more examples of which are illustrated in the drawings. Features illustrated or described as part of one embodiment can be used with other embodiments to yield still a third embodiment. It is intended that the present disclosure include these and other modifications and variations.

Figure 1B:
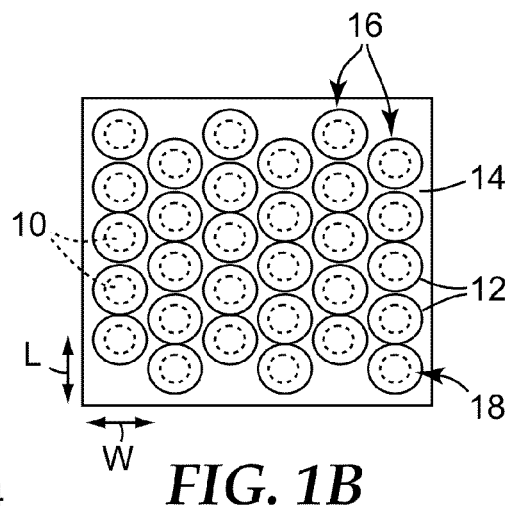
Figure 1C:
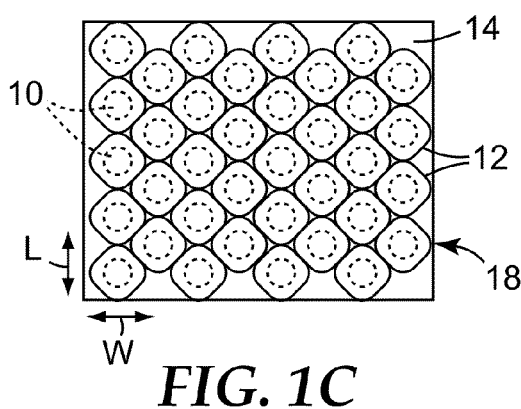
Figure 1D:
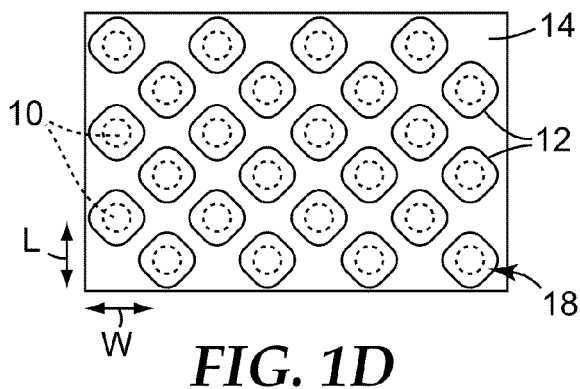

FIGS. 1A through 1D illustrate different stages of one embodiment of the method of making a structured surface according to the present disclosure. FIG. 1A shows a top view of an exemplary thermoplastic backing 14 with spaced-apart, upstanding posts 10. Although not shown in the FIGS., the posts have proximal ends and distal ends, with the proximal end including the base that is attached to the thermoplastic backing, and the distal end extending away from the thermoplastic backing. In FIG. 1B, the distal tips of the spaced-apart, upstanding posts 10 have been deformed to form caps 12 on the posts 10. The caps 12 in FIG. 1B are round as a result of a relatively low level of deformation. However, the level of deformation is high enough such that at least some caps upon forming touch at least one adjacent cap. In FIG. 1C, the distal tips of the spaced-apart, upstanding posts 10 shown in FIG. 1A have been deformed to a greater extent than that shown in FIG. 1B to form caps 12 on the posts 10. At this higher level of deformation, the edges of the caps 12 touch and do not allow further flow into a circular shape. As a result, the material flows into available open spaces to form cap shapes that are determined by the spacing of the posts 10. As shown in FIG. 1C, at least some of the caps upon forming are shaped at least partially by the least one adjacent cap. In FIGS. 1B and 1C, the caps 12 are larger in area than the cross-sectional area of the bases (not shown) and the cross-section area of the posts 10. FIG. 1D illustrates the result of separating (e.g., by stretching) the capped posts 18 so that the caps 12 are no longer touching. The separating shown in FIG. 1D may result from biaxial stretching, but monoaxial stretching or other separation may be useful in some embodiments.

FIGS. 1B and 1C also illustrate embodiments of a mechanical fastener precursor according to the present disclosure, and capped posts 18 correspond to male fastening elements. In the embodiment illustrated in FIGS. 1A through 1D, the precursor posts 10 and the capped posts 18 are arranged in rows 16, which in the illustrated embodiment are evenly spaced rows aligned in one direction, the longitudinal direction "L". The precursor posts 10 and capped posts 18 are staggered in a second direction "W", which is transverse to the first direction. The distance between the posts (i.e., pin spacing) is approximately equal in both directions. That is, the spaced-apart upstanding posts 10 (and capped posts 18) are substantially evenly spaced. "Substantially evenly spaced" means that the distances between posts 10 differ from each other by up to 10, 7.5, or 5 percent. The pin spacing and arrangement shown in FIGS. 1A to 1C results in caps 12 with shapes comprising angles. In the illustrated embodiment, the distal caps 12 are substantially in the shape of a rhombus (e.g., square or diamond), which means the distal caps have four approximately equal (e.g., within 10, 7.5, or 5 percent) sides and opposing approximately equal (e.g., within 10, 7.5, or 5 percent) angles and may have sharp or rounded corners. Advantageously, in the illustrated embodiment, some of the angles point in the second direction "W" to allow, for example, for better engagement of the caps with loop materials in some applications of the present disclosure. In other embodiments, loop materials may be best engaged with caps having angles that point in a direction other than "W" or "L". Advantageously, the arrangement of the posts may be adjusted to form caps with angles pointing in any desired direction.

Figure 5:
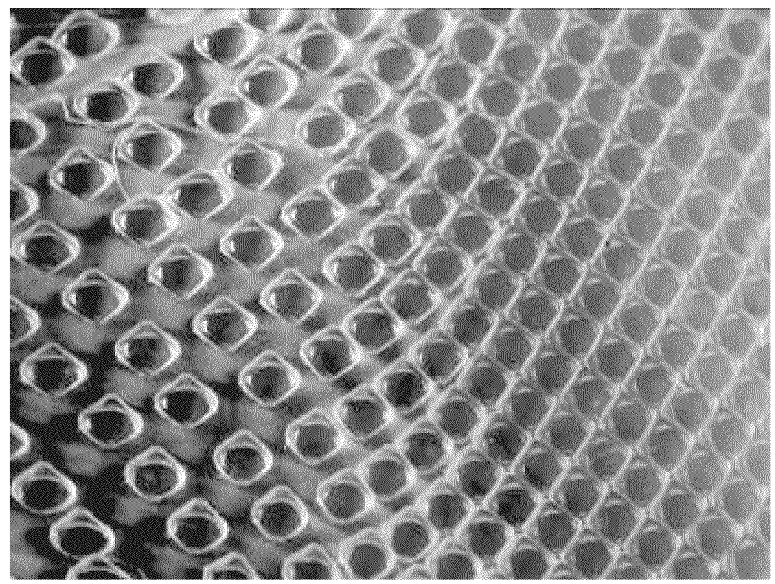
FIG. 5 is a photograph of a stretching zone of an exemplary structured surface showing stretched and unstretched regions.

The embodiment illustrated in FIGS. 1A through 1D is also shown in the FIG. 5 photograph. On the left side of FIG. 5 the backing is stretched as illustrated in FIG. 1D while on the right side of FIG. 5, the backing is not stretched as illustrated in FIG. 1C. The structured surface shown in the photograph in FIG. 5 was made with a 6000 pin per square inch (945 per square centimeter) tool and a flat capping roller. The photograph shows that it is possible to start with round stems to make square caps using only a flat capping roller.

Figure 2A:
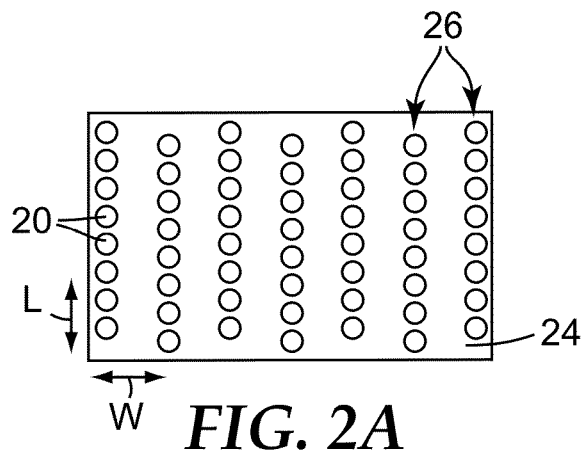
FIGS. 2A through 2C are top views of another embodiment of a structured surface at different stages of the method of making the structured surface according to the present disclosure.
Figure 2B:
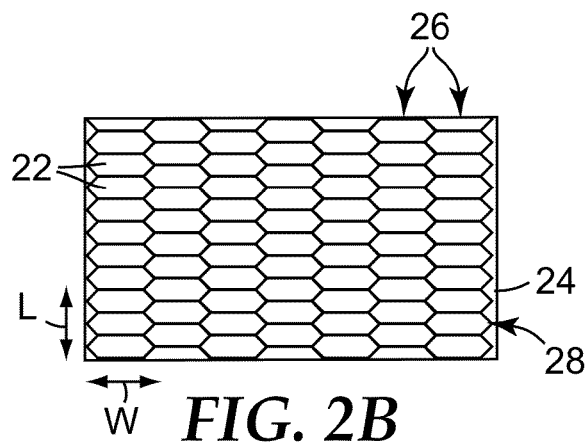
Figure 2C:
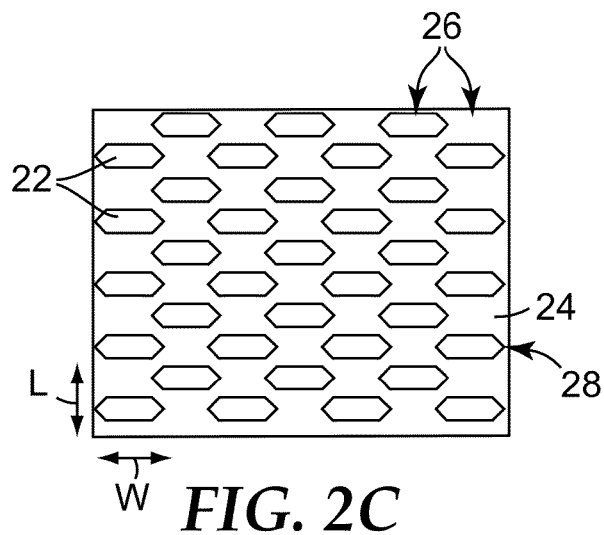

FIGS. 2A through 2C illustrate different stages of another embodiment of the method of making a structured surface according to the present disclosure. FIG. 2A shows a top view of an exemplary thermoplastic backing 24 with spaced-apart, upstanding posts 20. In FIG. 2B, the distal tips of the spaced-apart, upstanding posts 20 have been deformed to form caps 22 on the posts (not shown in FIG. 2B or 2C) such that at least some caps upon forming touch at least one adjacent cap. FIG. 2B also illustrates an embodiment of a mechanical fastener precursor according to the present disclosure. In FIG. 2B, the caps 22 are larger in area than the cross-sectional area of the bases (not shown) and the cross-section area of the posts. Like in the embodiments illustrated in FIGS. 1A through 1D, the posts 20 in FIGS. 2A through 2C are arranged in rows 26, which are aligned in the first direction "L" and evenly spaced across the backing 24 in a second direction "W" transverse to the first direction. The precursor posts 20 and capped posts 28 are also staggered in the second direction "W" like in FIGS. 1A through 1D. However, in the embodiment illustrated in FIGS. 2A through 2C, the spaced-apart, upstanding posts are unevenly spaced: the spacing of the posts 20 is much closer in the first direction "L" than in the second direction "W". This arrangement results in caps 22 also with shapes comprising angles (e.g., hexagons elongated in the second direction "W"). The elongation of the hexagons with angles pointing in the second direction can allow, for example, for better engagement of the caps with loop materials in some applications of the present disclosure. In other embodiments, loop materials may be best engaged with caps having angles that point in a direction other than "W" or "L". Advantageously, the arrangement of the posts may be adjusted to form caps with angles pointing in any desired direction. FIG. 2C illustrates the result of separating the capped posts 28 so that the caps 22 are no longer touching. The separating may be carried out by stretching the thermoplastic backing 24. In the illustrated embodiment, only separation in one direction (e.g., monoaxial stretching) is carried out, which is advantageous for process simplicity. But biaxial stretching of the thermoplastic backing 24 is also possible.

Figure 3A:
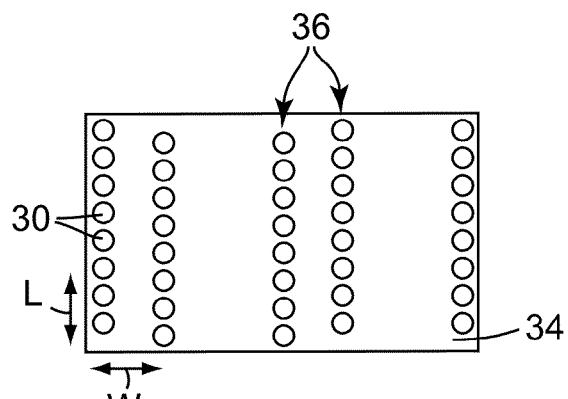
FIGS. 3A through 3C are top views of another embodiment of a structured surface at different stages of the method of making the structured surface according to the present disclosure.
Figure 3B:
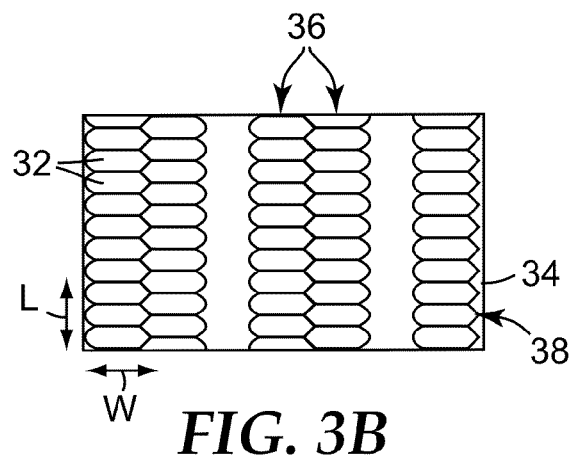
Figure 3C:
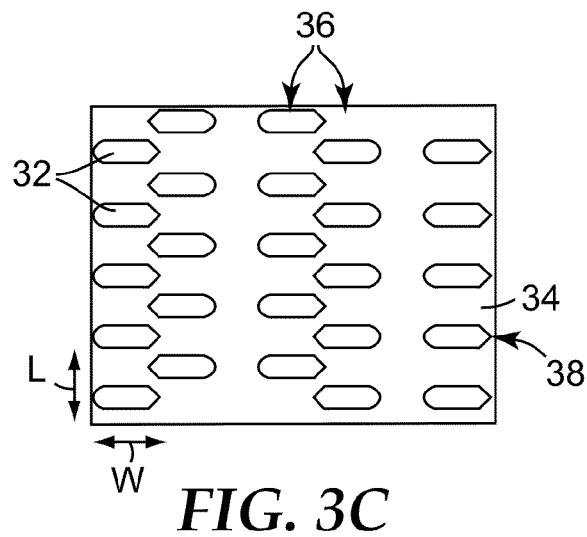

FIGS. 3A through 3C illustrate different stages of another embodiment of the method of making a structured surface according to the present disclosure. FIG. 3A shows a top view of an exemplary thermoplastic backing 34 with spaced-apart, upstanding posts 30. In FIG. 3B, the distal tips of the spaced-apart, upstanding posts 30 have been deformed to form caps 32 on the posts (not shown in FIG. 3B or 3C) such that at least some caps upon forming touch at least one adjacent cap. FIG. 3B also illustrates an embodiment of a mechanical fastener precursor according to the present disclosure. In FIG. 3B, the caps 32 are larger in area than the cross-sectional area of the bases (not shown) and the cross-section area of the posts. Like in the embodiments illustrated in 2A through 2C, the posts 30 are arranged in rows 36 aligned in the first direction "L", and the posts 30 are staggered in a second direction "W" and have closer spacing in the first direction "L" than in the second direction "W". However, in the embodiment illustrated in FIGS. 3A through 3C, the rows 36 are unevenly spaced across the backing 34 in the second direction "W" such that pairs of rows 36 can be identified. The spacing between each pair of rows 36 is greater than for the member rows of the pair. This arrangement results in caps 32 also with different elongated shapes than those formed in FIG. 2B. The caps 32 have shapes comprising angles on one end with a rounded opposite end, where the flow is not limited by a cap in an adjacent row. In this arrangement, the angles point in different directions for different rows 36, which may be advantageous for some applications. The arrangement of the posts may be adjusted to form caps with angles pointing in any desired direction, for example, for optimal engagement with a loop material. FIG. 3C illustrates the result of separating the capped posts 38 so that the caps 32 are no longer touching. The separating may be carried out by stretching the thermoplastic backing 34. In the illustrated embodiment, only separation in one direction (e.g., monoaxial stretching) is shown, but biaxial stretching of a thermoplastic backing 34 is also possible.

Figure 4A:
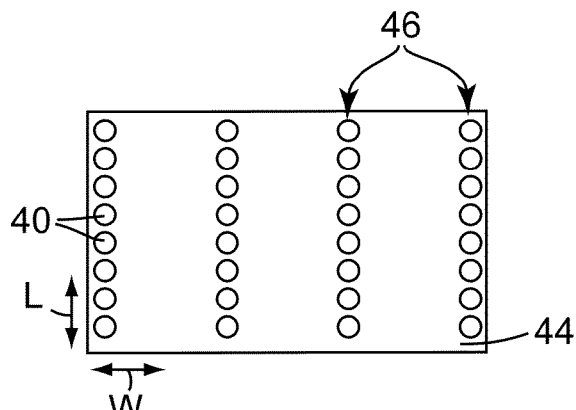
FIGS. 4A through 4C are top views of another embodiment of a structured surface at different stages of the method of making the structured surface according to the present disclosure.
Figure 4B:
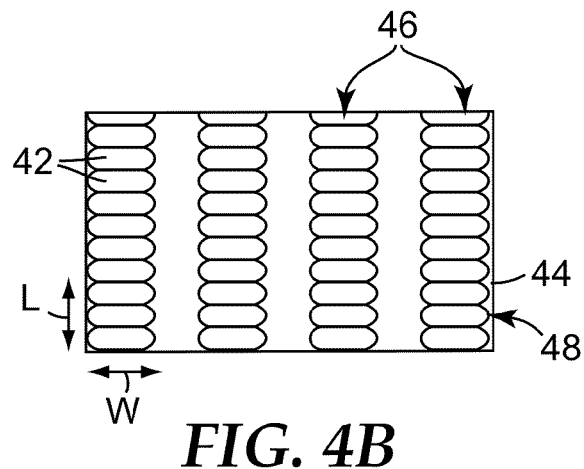
Figure 4C:
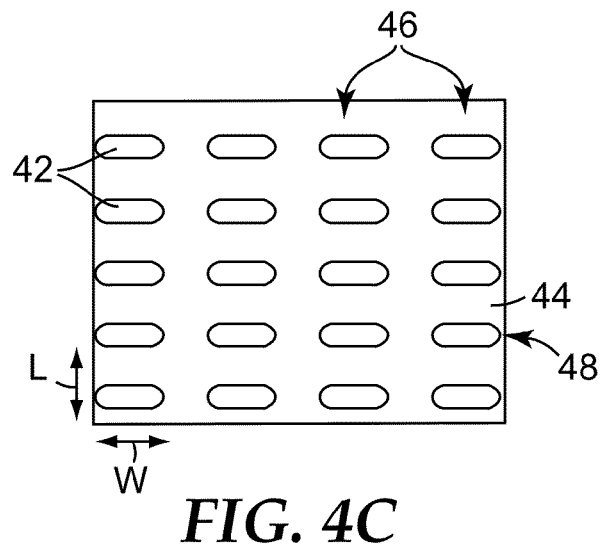

FIGS. 4A through 4C illustrate different stages of yet another embodiment of the method of making a structured surface according to the present disclosure. FIG. 4A shows a top view of an exemplary thermoplastic backing 44 with spaced-apart, upstanding posts 40. In FIG. 4B, the distal tips of the spaced-apart, upstanding posts 40 have been deformed to form caps 42 on the posts (not shown in FIGS. 4B and 4C) such that at least some caps upon forming touch at least one adjacent cap. FIG. 4B also illustrates an embodiment of a mechanical fastener precursor according to the present disclosure. In FIG. 4B, the caps 42 are larger in area than the cross-sectional area of the bases (not shown) and the cross-section area of the posts. Like in the embodiments illustrated in 3A through 3C, the posts 40 are arranged in rows 46 aligned in the first direction "L", and the posts have closer spacing in the first direction "L" than in the second direction "W". However, in the embodiment illustrated in FIGS. 4A through 4C, the rows 46 are spaced apart in the second direction "W" so that the caps 42 are shaped only by adjacent caps in the same row 46. This arrangement results in caps 42 with rounded oblong shapes. It should be understood that the caps 22 and 32 in FIGS. 2 and 3, respectively also have oblong shapes but that the shapes 22 and 32 also comprise angles. The posts 40 may be aligned or staggered in the second direction "W", and the rows 46 may be substantially evenly spaced or unevenly spaced across the thermoplastic backing 44 in the second direction "W". The arrangement of the posts may be adjusted to form caps with oblong shapes oriented in any desired direction, for example, for optimal engagement with a loop material. FIG. 4C illustrates the result of separating the capped posts 48 so that the caps 42 are no longer touching. The separating may be carried out by stretching the thermoplastic backing 44. In the illustrated embodiment, only separation in one direction (e.g., monoaxial stretching) is shown, but biaxial stretching of thermoplastic backing 44 is also possible.

Many thermoplastic materials are useful for structured surfaces and mechanical fastener precursors according to and/or made according to the present disclosure. Suitable thermoplastic materials for the thermoplastic backing 14, 24, 34, and 44 with spaced-apart upstanding posts 10, 20, 30, and 40 include polyolefin homopolymers such as polyethylene and polypropylene, copolymers of ethylene, propylene and/or butylene; copolymers containing ethylene such as ethylene vinyl acetate and ethylene acrylic acid; polyesters such as poly(ethylene terephthalate), polyethylene butyrate and polyethylene napthalate; polyamides such as poly(hexamethylene adipamide); polyurethanes; polycarbonates; poly(vinyl alcohol); ketones such as polyetheretherketone; polyphenylene sulfide; poly(acrylonitrile-butadiene-styrene); plasticized polyvinylchlorides; and mixtures thereof. Typically, the thermoplastic is a polyolefin (e.g., polyethylene, polypropylene, polybutylene, ethylene copolymers, propylene copolymers, butylene copolymers, and copolymers and blends of these materials). The various thermoplastic materials described above can be formulated into a master batch having a desired property (e.g., color).

In some embodiments, the thermoplastic backing 14, 24, 34, and 44 with spaced-apart upstanding posts 10, 20, 30, and 40 can be made from a multilayer or multi-component melt stream of thermoplastic materials. This can result in posts formed at least partially from a different thermoplastic material than the one predominately forming the backing. Various configurations of upstanding posts made from a multilayer melt stream are shown in U.S. Pat. No. 6,106,922 (Cejka et al.), for example. A multilayer or multi-component melt stream can be formed by any conventional method. A multilayer melt stream can be formed by a multilayer feedblock, such as that shown in U.S. Pat. No. 4,839,131 (Cloeren). A multicomponent melt stream having domains or regions with different components could also be used. Useful multicomponent melt streams could be formed by use of inclusion co-extrusion die or other known methods (e.g., that shown in U.S. Pat. No. 6,767,492 (Norquist et al.).

In the structured surfaces and mechanical fastener precursors according to and/or made according to the present disclosure the thermoplastic backing 14, 24, 34, and 44 and the spaced-apart upstanding posts 10, 20, 30, and 40 are typically integral (that is, formed at the same time as a unit, unitary). The thermoplastic backing is typically in the form of a sheet or web that may have an essentially uniform thickness with the spaced-apart upstanding posts directly attached to the thermoplastic backing. Upstanding posts on a backing can be made, for example, by conventional extrusion through a die and cast molding techniques. In some embodiments, a thermoplastic material is fed onto a continuously moving mold surface with cavities having the inverse shape of the upstanding posts. The thermoplastic material can be passed between a nip formed by two rolls or a nip between a die face and roll surface, with at least one of the rolls having the cavities (i.e., at least one of the rolls is a tool roll). Pressure provided by the nip forces the resin into the cavities. In some embodiments, a vacuum can be used to evacuate the cavities for easier filling of the cavities. The nip is typically sufficiently wide such that a coherent backing is formed over the cavities. The mold surface and cavities can optionally be air or water cooled before stripping the integrally formed backing and upstanding posts from the mold surface such as by a stripper roll.

Suitable tool rolls can be made, for example, by drilling (e.g., by electron beam) a series of holes having the inverse shape of the upstanding posts 10, 20, 30, and 40 into the cylindrical face of a metal mold or sleeve. Other suitable tool rolls include those formed from a series of plates defining a plurality of post-forming cavities about its periphery such as those described, for example, in U.S. Pat. No. 4,775,310 (Fischer). Cavities may be formed in the plates by drilling or photoresist technology, for example. Still other suitable tool rolls may include wire-wrapped rolls, which are disclosed along with their method of manufacturing, for example, in U.S. Pat. No. 6,190,594 (Gorman et al.). The exposed surface of the mold, sleeve, plate, or wire may be coated to impart surface properties such as increased wear resistance, controlled release characteristics, and controlled surface roughness. The coating, if present, is preferably selected so that the adhesion of the thermoplastic material to the tool roll is less than the cohesion of the thermoplastic material at the time of the removal of the thermoplastic backing from the tool roll.

Another exemplary method for forming a thermoplastic backing 14, 24, 34, and 44 with spaced-apart, upstanding posts 10, 20, 30, and 40 includes using a flexible mold belt defining an array of upstanding post-shaped cavities as described in U.S. Pat. No. 7,214,334 (Jens et al.). The mold belt is trained about first and second rolls, and a source of molten thermoplastic material is arranged to deliver the thermoplastic to the mold belt. The apparatus is constructed to force the plastic resin into the upstanding post-shaped cavities of the belt under pressure in a gap to mold the array of upstanding posts while forming the thermoplastic web layer.

Another suitable method for forming a thermoplastic backing 14, 24, 34, and 44 with spaced-apart, upstanding posts 10, 20, 30, and 40 is profile extrusion, which is described, for example, in U.S. Pat. No. 4,894,060 (Nestegard). Typically, in this method a thermoplastic flow stream is passed through a patterned die lip (e.g., cut by electron discharge machining) to form a web having downweb ridges. The ridges can then be transversely sliced at spaced locations along the extension of the ridges to form upstanding posts with a small separation caused by the cutting blade. However, it should be understood that "spaced-apart, upstanding posts" do not include such ridges before they are cut. Such ridges themselves would also not be considered "loop-engaging" because they would not be able to engage loops before they are cut and stretched. In some embodiments, methods according to the present disclosure do not include cutting ribs.

In addition to the continuous methods described above, it is also envisioned that thermoplastic backings having spaced-apart, upstanding posts can be prepared using batch processes (e.g., single piece injection molding). The thermoplastic backing may have any suitable dimension, but length (L) and width (W) dimensions of at least 10 cm may be useful.

In the method of making a structured surface or mechanical fastener precursor according to the present disclosure, the spaced-apart upstanding posts 10, 20, 30, and 40, which may be made, for example, by any of the methods described above, may have a variety of cross-sectional shapes. For example, the cross-sectional shape of the post may be a polygon (e.g., square, rectangle, hexagon, or pentagon), which may be a regular polygon or not, or the cross-sectional shape of the post may be curved (e.g., round or elliptical). An advantage of the method according to the present disclosure is that it provides separate control over the cap shape regardless of what the post shape is. Accordingly, in some embodiments, including the illustrated embodiments, the bases have a round cross-sectional shape, and the distal caps have a shape other than round.

In the method of making a structured surface or mechanical fastener precursor according to the present disclosure, the thermoplastic backing 14, 24, 34, and 44 may have a variety of thicknesses. For example, the initial thickness (i.e., before stretching) of the thermoplastic backing may be up to about 750, 500, 400, 250, or 150 micrometers, depending on the desired application. In some embodiments, the initial thickness of the backing is at least about 50, 75, or 100 micrometers, depending on the desired application. In some embodiments, the initial thickness of the thermoplastic backing is in a range from 50 to about 225 micrometers, from about 75 to about 200 micrometers, or from about 100 to about 150 micrometers. The thermoplastic backing may have an essentially uniform cross-section, or the thermoplastic backing may have additional structure beyond what is provided by the spaced-apart, upstanding posts, which may be imparted, for example, by at least one of the forming rolls described above.

In some embodiments, the upstanding posts 10, 20, 30, and 40 have a maximum height (above the backing) of up to 3 millimeters (mm), 1.5 mm, 1 mm, or 0.5 mm and, in some embodiments a minimum height of at least 0.05 mm, 0.075 mm, 0.1 mm, or 0.2 mm. In some embodiments, the posts have aspect ratio (that is, a ratio of height over a width dimension) of at least about 2:1, 3:1, or 4:1. The aspect ratio may be, in some embodiments, up to 10:1. The posts may have a cross-section with a maximum width dimension of up to 1 (in some embodiments, up to 0.75, 0.5, or 0.45) mm. In some embodiments, the posts have a cross-section with a width dimension between 10 μm and 250 μm. The term "width dimension" should be understood to include the diameter of a post with a circular cross-section. When the post has more than one width dimension (e.g., in a rectangular or elliptical cross-section shaped post), the aspect ratio described herein is the height over the largest width dimension.

In the method of making a structured surface or mechanical fastener precursor according to the present disclosure, the spaced-apart upstanding posts 10, 20, 30, and 40, which may be made, for example, by any of the methods described above, may have a shape that tapers, for example, from the base portion to the distal tip. The base portion may have a larger width dimension than the distal tip, which may facilitate the removal of the post from the mold surface in the methods described above. Again, in these embodiments where the posts have a shape that tapers, the aspect ratio described above is the height over the largest width dimension, which may be at the base of the post.

In some embodiments of the method of making a structured surface and the mechanical fastener precursor according to the present disclosure, the spaced-apart upstanding posts have an initial density (i.e., before stretching) of at least 248 per square centimeter ($cm^2$) (1600 per square inch, $in^2$). For example, the initial density of the posts 10, 20, 30, and 40 may be at least $394/cm^2$ ($2500/in^2$) or at least about $787/cm^2$ ($5000/in^2$). In some embodiments, the initial density of the posts 10, 20, 30, and 40 may be up to $5000/cm^2$ ($32000/in^2$), up to about $3900/cm^2$ ($25000/in^2$), or up to about $3150/cm^2$ ($20000/in^2$). Initial densities in a range from $787/cm^2$ ($5000/in^2$) to $3900/cm^2$ ($25000/in^2$) may be useful, for example. However, the spacing of the spaced-apart, upstanding posts need not be uniform.

The initial density of the spaced-apart upstanding posts in the method of making a structured surface is among the factors that influences whether at least some caps upon forming touch at least one adjacent cap after deforming the distal tips of the posts to provide capped posts. The posts need to be spaced close enough so that at least some caps can touch upon deformation. The height of the posts (described above) and the level of deformation also influence whether at least some caps upon forming touch at least one adjacent cap. Methods for deforming the distal tips to provide capped posts are now described in detail.

A variety of methods are useful for deforming the distal tips of the spaced-apart upstanding posts. The caps 12, 22, 32, and 42 that are formed after the deformation are larger in area than the cross-sectional area of the bases, and at least some of the caps touch at least one other cap. A ratio of a width dimension of the formed cap to the post measured at the base is typically at least 1.5:1 or 3:1 and may be up to 5:1 or greater. The capped posts 18, 28, 38, and 48 are typically shorter than the posts before deformation. In some embodiments, the capped posts 18, 28, 38, and 48 have a height (above the backing) of at least 0.025 mm, 0.05 mm, or 0.1 mm and, in some embodiments, up to 2 mm, 1.5 mm, 1 mm, or 0.5 mm.

In some embodiments of the method of making a structured surface according to the present disclosure, deforming the distal tips to form caps 12, 22, 32, and 42 comprises heating the distal tips. Typically, a combination heat and pressure is used to deform the distal tips of the posts to form caps. The heat and pressure can be applied sequentially or simultaneously.

In some embodiments, deforming comprises contacting the distal tips with a heated surface. The heated surface may be a flat surface or a textured surface such as that disclosed in U.S. Pat. No. 6,708,378 (Parellada et al.) or U.S. Pat. No. 5,868,987 (Kampfer et al.). In some embodiments, wherein the thermoplastic backing 14, 24, 34, and 44 with spaced-apart upstanding posts 10, 20, 30, and 40 is a web of indefinite length, the deforming comprises moving the web in a first direction through a nip having a heated surface member and an opposing surface member such that the heated surface member contacts the distal tips. In these embodiments, the heated surface may be, for example, a capping roll. In some embodiments, the surfaces used to contact the distal tips may not be heated. In these embodiments, the deformation is carried out with pressure and without heating.

In some embodiments, the heated surface may be a heated roll opposite a curved support surface forming a variable nip having a variable nip length as described, for example, in U.S. Pat. No. 6,368,097 (Miller et al.). The curved support surface may curve in the direction of the heated roll, and the heated roll may include a feeding mechanism for feeding the thermoplastic backing with spaced-apart, upstanding posts through the variable nip to compressively engage the web between the heated roll and the support surface.

Figure 6:
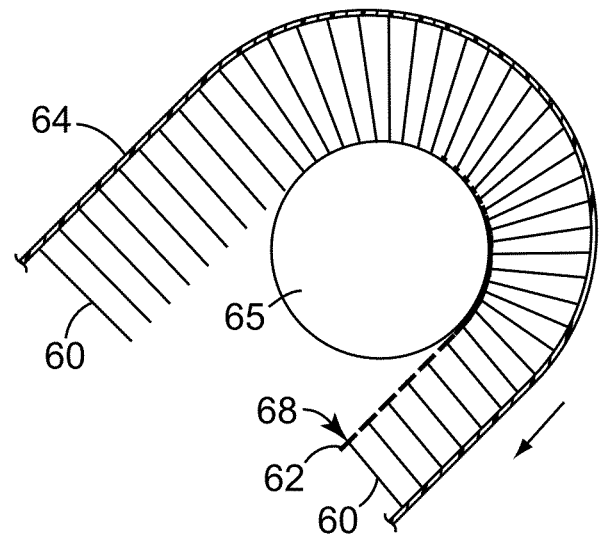
FIG. 6 is a schematic representation of an exemplary embodiment of a method of deforming distal tips to form caps on at least some of the spaced-apart, upstanding posts and separating the capped posts.

In some embodiments of the method according to the present disclosure, a method of deforming the distal tips to form caps is schematically illustrated in FIG. 6. The method comprises bending the thermoplastic backing 64 comprising spaced-apart, upstanding posts 60 around a roller 65 to cause the distal tips to be closer to each other, at least in the machine direction. As the thermoplastic backing 64 comes off the roller 65, the caps on the capped posts 68 will tend to separate from one another. In some embodiments, the distal tips are heated before the thermoplastic backing 64 is bent around a roller 65 to deform the distal tips. In other embodiments, the posts 60 are deformed just before contacting the small diameter roller 65, while the caps are still soft enough to be shaped at least partially by at least one adjacent cap. Pressure against the second surface of the thermoplastic backing (i.e., the surface opposite the first surface from which the spaced-apart, upstanding posts project) may be useful in some embodiments. The pressure may be provided by a nip, for example, formed by a second roller (not shown) positioned at the second surface of the thermoplastic backing. The nip may also be a variable nip formed from a curved support surface as described above. In some embodiments, a series of small diameter rollers may be used. The roller or rollers are typically small-diameter rollers having diameters, for example, of up to 0.5 inch (1.3 cm).

In some embodiments where deforming the distal tips to form caps includes bending the thermoplastic backing comprising spaced-apart, upstanding posts around a roller, the caps advantageously may not need to be as large or the pins as close as in other embodiments for at least some caps to touch at least one adjacent cap and, in some embodiments, to be shaped at least partially by at least one adjacent cap. In some of these embodiments, the thermoplastic backing need not be stretched. In other embodiments, stretching according to the methods described below may be applied to the thermoplastic backing after it comes off the roller to further separate the caps from each other.

In embodiments wherein deforming comprises heating the distal tips of the upstanding posts, including any of the embodiments described above, the heating is typically carried out below a melt temperature of the distal tips. When the thermoplastic material used to form the upstanding posts is a copolymer (e.g., copolymers of ethylene and propylene), the distal tips may have more than one melt temperature. In these embodiments, "below a melt temperature of the distal tips" means below at least one of the melt temperatures. Heating at a temperature below a melt temperature of the thermoplastic material in the distal tips is useful for preventing the caps upon forming from fusing together so that stretching the thermoplastic backing can readily separate the at least some caps from the at least one adjacent cap.

The mechanical fastener precursor according to the present disclosure may be formed, in some embodiments, after deforming the distal tips of the spaced-apart, upstanding posts to form caps but before the stretching of the thermoplastic backing. The caps formed after the distal tips of the posts are deformed are considered to have a loop-engaging shape, but before the stretching of the thermoplastic backing, the at least some caps that are touching at least one adjacent cap are typically not as effective for engaging a loop material as the caps after stretching that are no longer touching. In general, when the at least some caps touch at least one adjacent cap, there is not enough space around the caps for mechanical fastening engagement in multiple directions. For example, the mechanical fastener precursors shown in FIGS. 3B and 4B may demonstrate loop engagement if they are peeled in the direction "W" but may not demonstrate any loop engagement if they are peeled in the direction "L". In the mechanical fastener precursor according to the present disclosure, at least some of the distal caps touch at least one adjacent distal cap when the thermoplastic backing is in an unbent position. The thermoplastic backing is in an unbent position typically when it is flat. This is in contrast to the fasteners of U.S. Pat. No. 6,544,245 (Neeb et al.), in which hook elements can be caused to touch by bending the surface from which they protrude.

In some embodiments, the method of making a structured surface according to the present disclosure includes stretching the thermoplastic backing 14, 24, 34, and 44 in at least one direction to separate the capped posts 18, 28, 38, and 48. After stretching, the at least some caps 12, 22, 32, and 42 no longer touch the at least one adjacent cap. Stretching can be carried out on a web biaxially or monoaxially. Biaxial stretching means stretching in two different directions in the plane of the thermoplastic backing 14, 24, 34, and 44. Typically, but not always, the first direction is the longitudinal direction "L", and the second direction is the width direction "W". Biaxial stretching can be performed sequentially by stretching the thermoplastic backing, for example, first in one of the first or second direction and subsequently in the other of the first or second direction. Biaxial stretching can also be performed essentially simultaneously in both directions. Monoaxial stretching refers to stretching in only one direction in the plane of the thermoplastic backing 14, 24, 34, and 44. Typically, monoaxial stretching is performed in one of the "L" or "W" direction but other stretch directions are also possible.

In some embodiments, the stretching increases at least one of the thermoplastic backing's length ("L") or width ("W") at least 1.5 times (in some embodiments, at least 2, 2.5, or 3 times). In some embodiments, the stretching increases both of the thermoplastic backing's length ("L") and width ("W") at least 1.5 times (in some embodiments, at least 2, 2.5, or 3 times). In some embodiments, the stretching increases at least one of the thermoplastic backing's length ("L") or width ("W") up to 10 times (in some embodiments, up to 7 or 5 times). In some embodiments, the stretching increases both of the thermoplastic backing's length ("L") and width ("W") up to 10 times (in some embodiments, up to 7 or 5 times).

The stretching can be adjusted to maximize desired product properties (e.g. engagement with a desired loop). Stretching can be carried out to an extent so that the caps are separated enough to have the desired engagement properties without lowering the pin densities to a level too great for a desired application. In some embodiments, the stretching is carried out at least to the natural stretch ratio. When a thermoplastic film (e.g., a thermoplastic backing 14, 24, 34, or 44 as described herein) is monoaxially or biaxially stretched at a temperature below the melting point of the thermoplastic material, particularly at a temperature below the line drawing temperature of the film, the thermoplastic film may stretch non-uniformly, and a clear boundary is formed between stretched and unstretched parts. This phenomenon is referred to as necking or line drawing. However, substantially the entire thermoplastic backing is stretched uniformly when it is stretched to a sufficiently high degree. The stretch ratio at which this occurs is referred to as the "natural stretch ratio" or "natural draw ratio." The natural stretch ratio may be defined, for example, as the stretch ratio where the relative standard deviation of local stretch ratios measured at a variety of locations on the thermoplastic backing is below about 15 percent. Stretching above the natural stretch ratio is understood to provide significantly more uniform properties or characteristics such as thickness, tensile strength, and modulus of elasticity. For any given thermoplastic backing and stretch conditions, the natural stretch ratio is determined by factors such as the composition of the thermoplastic resin forming the thermoplastic backing, the morphology of the formed thermoplastic backing due to quenching conditions on the tool roll, for example, and temperature and rate of stretching. Furthermore, for biaxially stretched thermoplastic backings, the natural stretch ratio in one direction will be affected by the stretch conditions, including final stretch ratio, in the other direction. Thus, there may be said to be a natural stretch ratio in one direction given a fixed stretch ratio in the other, or, alternatively, there may be said to be a pair of stretch ratios (one in the first direction and one in the second direction) which result in the natural stretch ratio. The term "stretch ratio" refers to ratio of a linear dimension of a given portion of the thermoplastic backing after stretching to the linear dimension of the same portion before stretching.

When the thermoplastic backing is a web of indefinite length, for example, monoaxial stretching in the machine direction can be performed by propelling the thermoplastic web over rolls of increasing speed. The most versatile stretching method that allows for monoaxial, sequential biaxial, and simultaneous biaxial stretching of a thermoplastic web employs a flat film tenter apparatus. Such an apparatus grasps the thermoplastic web using a plurality of clips, grippers, or other film edge-grasping means along opposing edges of the thermoplastic web in such a way that monoaxial, sequential biaxial, or simultaneous biaxial stretching in the desired direction is obtained by propelling the grasping means at varying speeds along divergent rails. Increasing clip speed in the machine direction generally results in machine-direction stretching. Means such as diverging rails generally results in cross-direction stretching. Monoaxial and biaxial stretching can be accomplished, for example, by the methods and apparatus disclosed in U.S. Pat. Appl. Pub. No. 2005/0202205 (Petersen et al.) and the references cited therein. Flat film tenter stretching apparatuses are commercially available, for example, from Brückner Maschinenbau GmbH, Siegsdorf, Germany.

In some embodiments, stretching is performed at elevated temperatures. This may allow the thermoplastic backing to be more flexible for stretching. Heating can be provided, for example, by IR irradiation, hot air treatment or by performing the stretching in a heat chamber. In some embodiments, heating is only applied to the second surface of the thermoplastic backing (i.e., the surface opposite the first surface from which the spaced-apart, upstanding posts project) to minimize any damage to the capped posts that may result from heating. For example, in these embodiments, only rollers that are in contact with the second surface of the thermoplastic backing are heated.

After stretching, the thickness of the thermoplastic backing 14, 24, 34, and 44 is decreased so that the ratio of the thickness of the thermoplastic backing before stretching to the thickness of the thermoplastic backing after stretching can be, for example, from 2:1 or 3:1 to 10:1, in some embodiments, from 5:1 to 10:1. The thickness of the thermoplastic backing 14, 24, 34, and 44 may be, for example, in a range from 5 to 200 μm, 10 to 100 μm, or 30 to 70 μm.

After stretching the final density of the capped posts is less than the initial density of the capped posts. In some embodiments of the method of making a structured surface according to the present disclosure, the capped posts 18, 28, 38, and 48, for example, have a final density (i.e., after stretching) of at least 124 per square centimeter ($cm^2$) (800 per square inch, $in^2$). For example, the final density of the posts 10, 20, 30, and 40 may be at least 248/$cm^2$ (1600/$in^2$) or at least about 394/$cm^2$ (2500/$in^2$). In some embodiments, the final density of the posts 10, 20, 30, and 40 may be up to 787/$cm^2$ (5000/$in^2$), up to about 1574/$cm^2$ (10000/$in^2$), or up to about 3150/$cm^2$ (20000/$in^2$). Final densities in a range from 124/$cm^2$ (800/$in^2$) to 2,500 $cm^2$ (15900/$in^2$), 124/$cm^2$ (800/$in^2$) to 2,000 $cm^2$ (12700/$in^2$), and 124/$cm^2$ (800/$in^2$) to 1574 $cm^2$ (10000/$in^2$) may be useful, for example. Again, the spacing of the capped posts need not be uniform.

For any of the embodiments of methods of making a structured surface or a mechanical fastener precursor illustrated in FIGS. 1 to 4, the thermoplastic backing may be in the form of a roll, from which mechanical fastener patches, for example, may be cut in a size appropriate to the desired application. In this application, the thermoplastic backing 14, 24, 34, and 44 may also be a patch that has been cut to a desired size. In some of these embodiments, the second surface of the thermoplastic backing (i.e., the surface opposite the first surface from which the spaced-apart, upstanding posts project) may be coated with an adhesive (e.g., a pressure sensitive adhesive). In such embodiments, when the thermoplastic backing is in the form of a roll, a release liner may applied to the exposed adhesive.

In some embodiments of the method of making a structured surface disclosed herein, the thermoplastic backing 14, 24, 34, and 44 is not joined to a carrier, at least when it is initially formed. In other embodiments, the method further comprises joining a second surface of the thermoplastic backing (i.e., the surface opposite the first surface from which the spaced-apart, upstanding posts project) to a carrier. The thermoplastic backing may be joined to a carrier, for example, by lamination (e.g., extrusion lamination), adhesives (e.g., pressure sensitive adhesives), or other bonding methods (e.g., ultrasonic bonding, compression bonding, or surface bonding). Such joining methods may be carried out before deforming the distal tips of the upstanding posts, after deforming the distal tips of the upstanding posts but before stretching the thermoplastic backing, or after stretching the thermoplastic backing, as desired. The thermoplastic backing may be joined to a carrier during the formation of the thermoplastic backing with upstanding posts. The resulting article may be a fastening laminate, for example, a fastening tab joined to the backsheet of an absorbent article useful for joining the front waist region and the rear waist region of an absorbent article.

The carrier, which in some embodiments may be joined to the second surface of the thermoplastic backing, may be continuous (i.e., without any through-penetrating holes) or discontinuous (e.g. comprising through-penetrating perforations or pores). The carrier may comprise a variety of suitable materials including woven webs, non-woven webs (e.g., spunbond webs, spunlaced webs, airlaid webs, meltblown web, and bonded carded webs), textiles, plastic films (e.g., single- or multilayered films, coextruded films, laterally laminated films, or films comprising foam layers), and combinations thereof. In some embodiments, the carrier is a fibrous material (e.g., a woven, nonwoven, or knit material). The term "nonwoven" when referring to a carrier or web means having a structure of individual fibers or threads which are interlaid, but not in an identifiable manner as in a knitted fabric. Nonwoven fabrics or webs can be formed from various processes such as meltblowing processes, spunbonding processes, spunlacing processes, and bonded carded web processes. In some embodiments, the carrier comprises multiple layers of nonwoven materials with, for example, at least one layer of a meltblown nonwoven and at least one layer of a spunbonded nonwoven, or any other suitable combination of nonwoven materials. For example, the carrier may be a spunbond-meltbond-spunbond, spunbond-spunbond, or spunbond-spunbond-spunbond multilayer material. Or, the carrier may be a composite web comprising a nonwoven layer and a dense film layer.

Fibrous materials that provide useful carriers may be made of natural fibers (e.g., wood or cotton fibers), synthetic fibers (e.g., thermoplastic fibers), or a combination of natural and synthetic fibers. Exemplary materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material.

Useful carriers may have any suitable basis weight or thickness that is desired for a particular application. For a fibrous carrier, the basis weight may range, e.g., from at least about 20, 30, or 40 grams per square meter, up to about 400, 200, or 100 grams per square meter. The carrier may be up to about 5 mm, about 2 mm, or about 1 mm in thickness and/or at least about 0.1, about 0.2, or about 0.5 mm in thickness.

One or more zones of the carrier may comprise one or more elastically extensible materials extending in at least one direction when a force is applied and returning to approximately their original dimension after the force is removed. The term "elastic" refers to any material that exhibits recovery from stretching or deformation. Likewise, "nonelastic" materials, which do not exhibit recovery from stretching or deformation, may be useful for the carrier as well. In embodiments wherein the carrier is elastic, the joining of the carrier to the second surface of the thermoplastic backing is typically carried out after separating the at least some caps from the at least one adjacent cap (e.g., after stretching).

The fastening laminate that can be formed after joining the thermoplastic backing to a carrier may be useful, for example, in absorbent articles. Exemplary absorbent articles have at least a front waist region, a rear waist region, and a longitudinal center line bisecting the front waist region and the rear waist region, wherein at least one of the front waist region or the rear waist region comprises the structured surface made according to the method disclosed herein. The fastening laminate may be in the form of a fastening tab that is bonded to at least one of the front waist region or the rear waist region extending outwardly from at least one of the left longitudinal edge or the right longitudinal edge of the absorbent article. In other embodiments, the fastening laminate may be an integral ear portion of the absorbent article. The fastening laminate may also be useful, for example, for disposable articles such as sanitary napkins. A sanitary napkin typically includes a back sheet that is intended to be placed adjacent to the wearer's undergarment. The back sheet may comprise a thermoplastic backing with spaced-apart, upstanding capped posts to securely attach the sanitary napkin to the undergarment, which mechanically engages with the capped posts.

The longitudinal direction "L" (in some embodiments, the machine direction) of the structured surface may be generally aligned with the longitudinal center line of the absorbent article. In embodiments wherein the at least some caps have shapes comprising angles, the angles are aligned at a nonzero angle to the longitudinal center line of the absorbent article, which may enhance the peel performance of the structured surface when the fastening tab is removed from a mating surface on the absorbent article. The nonzero angle may be in a range from 30 to 90 degrees, 50 to 90 degrees, 60 to 90 degrees, 75 to 90 degrees, 80 to 90 degrees, or 85 to 90 degrees.

In some embodiments where the carrier is a fibrous web, joining the second surface of the thermoplastic backing to a carrier comprises impinging heated gaseous fluid (e.g., ambient air, dehumidified air, nitrogen, an inert gas, or other gas mixture) onto a first surface of the fibrous web while it is moving; impinging heated fluid onto the second surface of the backing while the continuous web is moving, wherein the second surface is opposite the first surface of the backing; and contacting the first surface of the fibrous web with the second surface of the backing so that the first surface of the fibrous web is melt-bonded (e.g., surface-bonded or bonded with a loft-retaining bond) to the second surface of the backing. Impinging heated gaseous fluid onto the first surface of the fibrous web and impinging heated gaseous fluid on the second surface of the backing may be carried out sequentially or simultaneously. The term "surface-bonded" when referring to the bonding of fibrous materials means that parts of fiber surfaces of at least portions of fibers are melt-bonded to the second surface of the backing, in such a manner as to substantially preserve the original (pre-bonded) shape of the second surface of the backing, and to substantially preserve at least some portions of the second surface of the backing in an exposed condition, in the surface-bonded area. Quantitatively, surface-bonded fibers may be distinguished from embedded fibers in that at least about 65% of the surface area of the surface-bonded fiber is visible above the second surface of the backing in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous web has the second surface of the backing bonded thereto, the retained loft can be easily ascertained by comparing the loft of the fibrous web in the bonded area to that of the web in an unbonded area. It may be convenient in some circumstances to compare the loft of the bonded web to that of a sample of the same web before being bonded, for example, if the entirety of fibrous web has the second surface of the backing bonded thereto.

Methods and apparatus for joining a continuous web to a fibrous carrier web using heated gaseous fluid may be found in co-pending U.S. patent applications with Ser. Nos. 61/288,952 and 61/288,959, both filed Dec. 22, 2009, and incorporated herein by reference in their entirety.

Selected Embodiments of the Disclosure

In a first embodiment, the present disclosure provides a method of making a structured surface, the method comprising:

providing a thermoplastic backing with spaced-apart, upstanding posts comprising base portions attached to the thermoplastic backing and distal tips;

deforming the distal tips to form caps on at least some of the spaced-apart, upstanding posts to provide capped posts, wherein at least some caps upon forming touch at least one adjacent cap, and wherein the capped posts retain spaced-apart base portions; and separating the capped posts such that the at least some caps no longer touch the at least one adjacent cap.

In a second embodiment, the present disclosure provides a method of making a structured surface according to the first embodiment, wherein the at least some caps upon forming are shaped at least partially by the at least one adjacent cap.

In a third embodiment, the present disclosure provides a method of making a structured surface according to the first or second embodiments, wherein separating the capped posts comprises stretching the thermoplastic backing in at least one direction.

In a fourth embodiment, the present disclosure provides a method of making a structured surface according to any one of the first to third embodiments, wherein deforming the distal tips to form caps comprises bending the thermoplastic backing around a roller such that at least some caps touch at least one adjacent cap when they are in contact with the roller.

In a fifth embodiment, the present disclosure provides a method of making structured surface according to the fourth embodiment, wherein upon coming off the roller, the capped posts separate, and the at least some caps no longer touch the at least one adjacent cap.

In a sixth embodiment, the present disclosure provides a method of making a structured surface according to any one of the first to fifth embodiments, wherein the structured surface is a mechanical fastener.

In a seventh embodiment, the present disclosure provides a method of making a structured surface according to any one of the first to sixth embodiments, wherein the at least some caps upon forming touch at least two adjacent caps.

In an eighth embodiment, the present disclosure provides a method of making a structured surface according to any one of the first to seventh embodiments, further comprising heating the distal tips before or during the deforming.

In a ninth embodiment, the present disclosure provides a method of making a structured surface according to the eighth embodiment, the heating is at a temperature below a melt temperature of the distal tips.

In a tenth embodiment, the present disclosure provides a method of making a structured surface according to any one of the first to ninth embodiments, wherein the deforming comprises contacting the distal tips with a heated surface.

In an eleventh embodiment, the present disclosure provides a method of making a structured surface according to the tenth embodiment, wherein the heated surface is a textured surface.

In a twelfth embodiment, the present disclosure provides a method of making a structured surface according to any one of the first to eleventh embodiments, wherein the thermoplastic backing is a web of indefinite length.

In a thirteenth embodiment, the present disclosure provides a method of making a structured surface according to the twelfth embodiment, wherein the deforming comprises moving the web in a first direction through a nip having a heated surface member and an opposing surface member such that the heated surface member contacts the distal tips.

In a fourteenth embodiment, the present disclosure provides a method of making a structured surface according to any one of the first to thirteenth embodiments, wherein the caps and the base portions of the capped posts have shapes that are different from each other.

In a fifteenth embodiment, the present disclosure provides a method of making a structured surface according to any one of the first to fourteenth embodiments, wherein before the deforming, the spaced-apart upstanding posts have a height of at least 50 microns.

In a sixteenth embodiment, the present disclosure provides a method of making a structured surface according to any one of the first to fifteenth embodiments, wherein before the deforming, the spaced-apart upstanding posts have a ratio of height over a width dimension of at least 2:1.

In a seventeenth embodiment, the present disclosure provides a method of making a structured surface according to any one of the first to sixteenth embodiments, wherein before separating the capped posts, the spaced-apart upstanding posts have an initial density of at least 248 per square centimeter (1600 per square inch).

In an eighteenth embodiment, the present disclosure provides a method of making a structured surface according to any one of the first to seventeenth embodiments, wherein separating the capped posts comprises stretching the thermoplastic backing in at least one direction, and wherein after the stretching, the structured surface has a final density of capped posts of at least 124 per square centimeter (800 per square inch).

In a nineteenth embodiment, the present disclosure provides a method of making a structured surface according to any one of the first to eighteenth embodiments, wherein separating the capped posts comprises stretching the thermoplastic backing, and wherein the stretching is monoaxial.

In a twentieth embodiment, the present disclosure provides a method of making a structured surface according to any one of the first to eighteenth embodiments, wherein separating the capped posts comprises stretching the thermoplastic backing, and wherein the stretching is biaxial.

In a twenty-first embodiment, the present disclosure provides a method of making a structured surface according to the nineteenth or twentieth embodiment, wherein the stretching increases at least one of the thermoplastic backing's length or width at least 1.5 times.

In a twenty-second embodiment, the present disclosure provides a method of making a structured surface according to any one of the first to twenty-first embodiments, wherein the spaced-apart upstanding posts are substantially evenly spaced.

In a twenty-third embodiment, the present disclosure provides a method of making a structured surface according to any one of the first to twenty-second embodiments, wherein the spaced-apart upstanding posts are arranged in rows aligned in a first direction and unevenly spaced in a second direction transverse to the first direction.

In a twenty-fourth embodiment, the present disclosure provides a method of making a structured surface according to any one of the first to twenty-third embodiments, wherein the spaced-apart upstanding posts are arranged in rows aligned in a first direction, and wherein adjacent rows have the spaced-apart upstanding posts staggered in a second direction transverse to the first direction.

In a twenty-fifth embodiment, the present disclosure provides a method of making a structured surface according to any one of the first to twenty-fourth embodiments, wherein the at least some caps after forming have shapes comprising angles.

In a twenty-sixth embodiment, the present disclosure provides a method of making a structured surface according to the twenty-fifth embodiment, wherein the thermoplastic backing is a web having a machine direction and a cross direction, and wherein at least some of the angles point in the cross direction.

In a twenty-seventh embodiment, the present disclosure provides a mechanical fastener precursor having a length in a first direction, the mechanical fastener precursor comprising:
  a thermoplastic backing; and
  upstanding male fastening elements comprising bases attached to the thermoplastic backing and distal caps larger in area than the cross-sectional area of the bases, wherein the bases of the male fastening elements are spaced apart, wherein at least some of the distal caps touch at least one adjacent distal cap when the thermoplastic backing is in an unbent position, and wherein the distal caps are separable upon stretching the thermoplastic backing.

In a twenty-eighth embodiment, the present disclosure provides a mechanical fastener precursor according to the twenty-seventh embodiment, wherein at least some distal caps touch at least two adjacent distal caps.

In a twenty-ninth embodiment, the present disclosure provides a mechanical fastener precursor according to the twenty-seventh or twenty-eighth embodiment, wherein the mechanical fastener precursor has a density of the bases of the male fastening elements of at least 248 per square centimeter (1600 per square inch).

In a thirtieth embodiment, the present disclosure provides a mechanical fastener precursor according to any one of the twenty-seventh to twenty-ninth embodiments, wherein the bases have a round cross-sectional shape, and wherein the distal caps have a shape other than round.

In a thirty-first embodiment, the present disclosure provides a mechanical fastener precursor according to any one of the twenty-seventh to thirtieth embodiments, wherein the bases of the male fastening elements are substantially evenly spaced.

In a thirty-second embodiment, the present disclosure provides a mechanical fastener precursor according to the thirty-first embodiment, wherein the distal caps are substantially in the shape of a rhombus.

In a thirty-third embodiment, the present disclosure provides a mechanical fastener precursor according to the thirty-second embodiment, wherein one diagonal of the rhombus is aligned in a first direction, and wherein a second diagonal of the rhombus is aligned in a second direction transverse to the first direction.

In a thirty-fourth embodiment, the present disclosure provides a mechanical fastener precursor according to any one of the twenty-seventh to thirty-third embodiments, wherein the bases of the male fastening elements are arranged in rows aligned in the first direction, wherein the rows are unevenly spaced in a second direction transverse to the first direction, and wherein the caps have at least one of oblong shapes or hexagonal shapes.

In a thirty-fifth embodiment, the present disclosure provides a mechanical fastener precursor according to the thirty-fourth embodiment, wherein the at least one of oblong or hexagonal shapes are longer in the second direction than the first direction.

In a thirty-sixth embodiment, the present disclosure provides a mechanical fastener precursor according to any one of the twenty-seventh to thirty-fifth embodiments, wherein the bases of the male fastening elements are arranged in rows aligned in the first direction, and wherein adjacent rows have male fastening elements staggered in a second direction transverse to the first direction.

In a thirty-seventh embodiment, the present disclosure provides a mechanical fastener precursor according to any one of the twenty-seventh to thirty-sixth embodiments, wherein the mechanical fastener precursor is a web of indefinite length in the first direction.

In a thirty-eighth embodiment, the present disclosure provides a mechanical fastener precursor according to the thirty-seventh embodiment, wherein the web is wound into a roll.

This disclosure may take on various modifications and alterations without departing from its spirit and scope. Accordingly, this disclosure is not limited to the above-described embodiments but is to be controlled by the limitations set forth in the following claims and any equivalents thereof. This disclosure may be suitably practiced in the absence of any element not specifically disclosed herein. All patents and patent applications cited above are hereby incorporated by reference into this document in their entirety.

What is claimed is:

1. A method of making a structured surface, the method comprising:
    providing a thermoplastic backing with spaced-apart, upstanding posts comprising base portions attached to the thermoplastic backing and distal tips;
    deforming the distal tips to form caps on at least some of the spaced-apart, upstanding posts to provide capped posts, wherein at least some caps touch at least one adjacent cap and are shaped at least partially by the at least one adjacent cap, and wherein the capped posts retain spaced-apart base portions; and
    separating the capped posts such that the at least some caps no longer touch the at least one adjacent cap.

2. A method of making a structured surface according to claim 1, wherein separating the capped posts comprises stretching the thermoplastic backing in at least one direction.

3. A method of making a structured surface according to claim 2, wherein before the stretching, the spaced-apart upstanding posts have an initial density of at least 248 per square centimeter, and wherein after the stretching, the structured surface has a final density of capped posts of at least 124 per square centimeter.

4. A method of making a structured surface according to claim 1, wherein deforming the distal tips to form caps comprises bending the thermoplastic backing around a roller such that at least some caps touch at least one adjacent cap when they are in contact with the roller, and wherein upon coming off the roller, the capped posts separate, and the at least some caps no longer touch the at least one adjacent cap.

5. A method of making a structured surface according to claim 1, wherein the structured surface is a mechanical fastener.

6. A method of making a structured surface according to claim 1, wherein the at least some caps upon forming touch at least two adjacent caps.

7. A method of making a structured surface according to claim 1, further comprising heating the distal tips before or during the deforming.

8. A method of making a structured surface according to claim 7, wherein the heating is at a temperature below a melt temperature of the distal tips.

9. A method of making a structured surface according to claim 1, wherein the deforming comprises contacting the tips with a heated surface.

10. A method according to claim 9, wherein the heated surface is a textured surface.

11. A method of making a structured surface according to claim 1, wherein the thermoplastic backing is a web of indefinite length.

12. A method according to claim 11, wherein the deforming comprises moving the web in a first direction through a nip having a heated surface member and an opposing surface member such that the heated surface member contacts the distal tips.

13. A method of making a structured surface according to claim 1, wherein the caps and the base portions of the capped posts have shapes that are different from each other.

14. A method according to claim 13, wherein the base portions have a round cross-sectional shape, and wherein the caps on the capped posts have a shape other than round.

15. A method of making a structured surface according to claim 1, wherein the at least some caps after forming have shapes comprising angles, wherein the thermoplastic backing is a web having a machine direction and a cross direction, and wherein at least some of the angles point in the cross direction.

16. A method according to claim 1, wherein the caps on the capped posts are substantially in the shape of a rhombus.

17. A method according to claim 1, wherein the base portions of the capped posts are arranged in rows aligned in the first direction, wherein the rows are unevenly spaced in a second direction transverse to the first direction, and wherein the caps on the capped posts have at least one of oblong shapes or hexagonal shapes.

18. A method according to claim 17, wherein the at least one of oblong or hexagonal shapes are longer in the second direction than the first direction.

19. A method according to claim 1, wherein the spaced-apart upstanding posts are substantially evenly spaced.

20. A method according to claim 1, wherein the spaced-apart upstanding posts are arranged in rows aligned in a first direction, and wherein adjacent rows have the spaced-apart upstanding posts staggered in a second direction transverse to the first direction.

* * * * *